൹

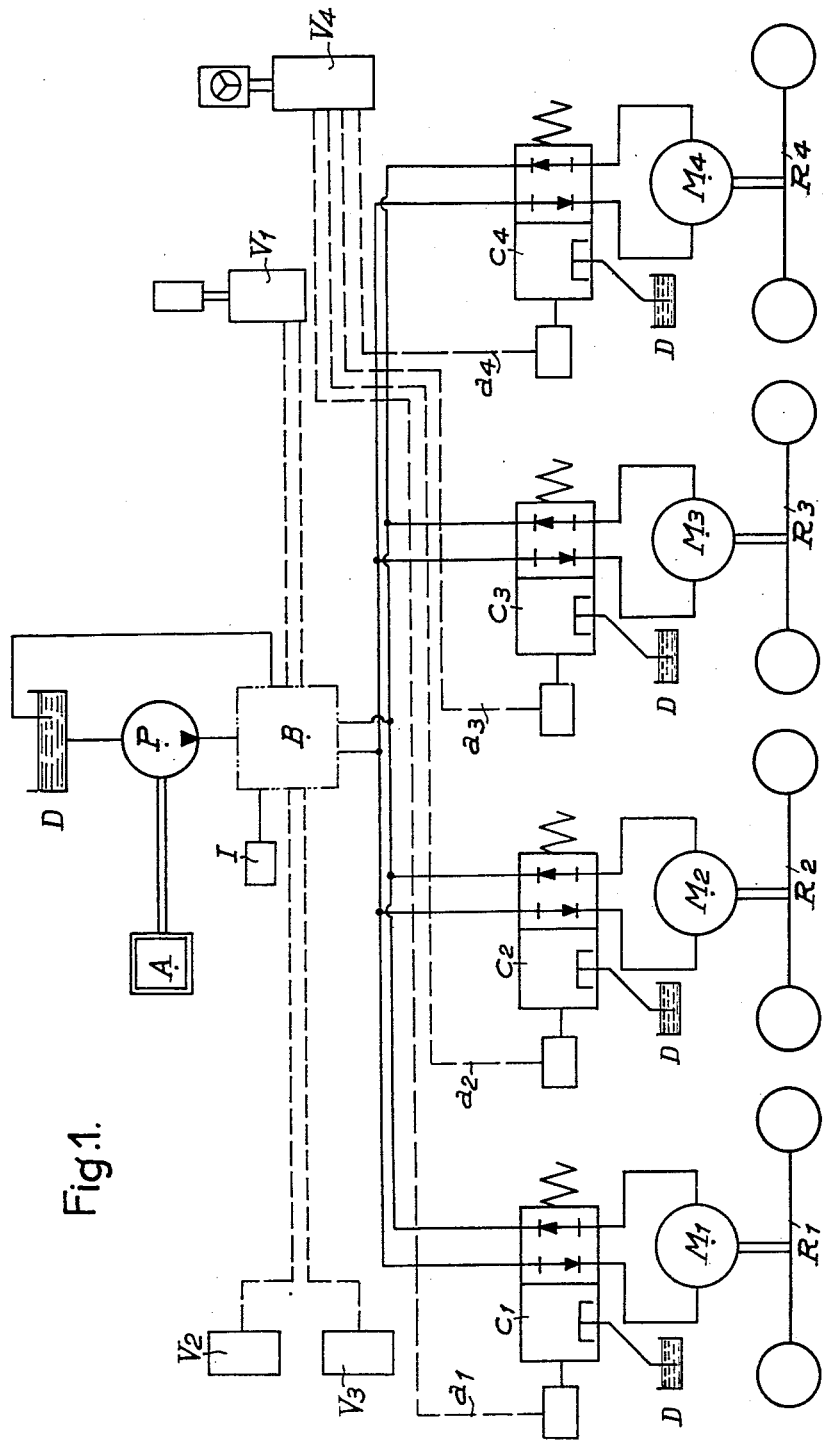

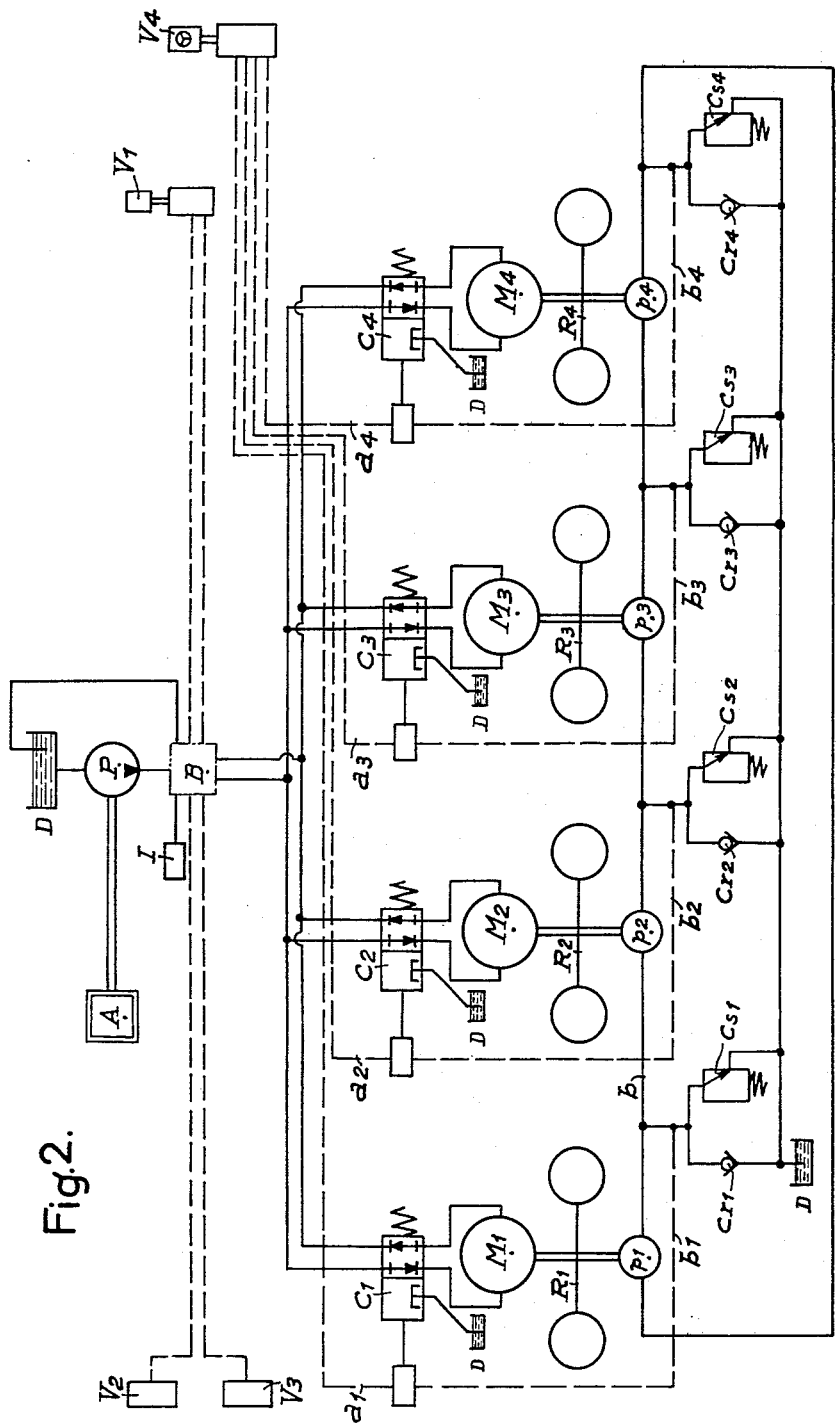

United States Patent Office 3,149,464
Patented Sept. 22, 1964

1

3,149,464
HYDRAULIC DEVICES FOR SYNCHRONIZING THE HYDRAULIC MOTORS ASSOCIATED WITH THE WHEELS OF A VEHICLE
Jean Fauchere, Paris, France, assignor to
Richier S.A., Paris, France
Filed Oct. 30, 1962, Ser. No. 234,128
Claims priority, application France, Oct. 31, 1961,
877,544, Patent 1,311,969
3 Claims. (Cl. 60—53)

Vehicles having a plurality of drive wheels are known which comprises a compressed-fluid distributing system incorporating a distributor unit proper and wherein a hydraulic motor is associated with each wheel for driving same, each motor being connected to the inlet and outlet ports of the distributor unit, with valve means for supplying compressed fluid to this motor under the control of a hydraulic pilot pipe line whereby the supply of energizing fluid to the hydraulic motor of this wheel is discontinued when said pipe line is fed with compressed fluid.

It is the primary object of this invention to provide a vehicle of the general type set forth hereinabove which is completed with a hydraulic system for automatically synchoniznig the hydraulic motors associated with the different wheels and therefore the wheels proper.

A known system for automatically synchronizing the wheels of a vehicle which are actuated by separate hydraulic motors fed from a common distributor unit, consists in acting upon valve means interposed in the supply lines leading to these motors. However, this system is applicable to two wheels only and is operated mechanically or electrically.

A hydraulic motor is also known of which the supply of compressed fluid is controlled by comparison with a separate reference shaft driven by separate means at a velocity of rotation deemed appropriate, so as to maintain the synchronism between this motor and the reference motor. This system would not be applicable even to two wheels of a hydraulic motor of a vehicle. In fact, the wheel mounted on the reference shaft would not be subjected to any control action and therefore would race loose in case of insufficient contact with the ground.

The vehicle according to this invenion is characterized in that it comprises a group of pumps equal in number to that of the drive wheels, these pumps being mounted in series in a common hydraulic circuit and positively driven for rotation from the separate hydraulic motors associated with the wheels, and hydraulic means connecting the outlet of each pump to the pilot line controlling the feed valve of the relevant motor.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunciton with the accompanying drawings, in which:

FIGURE 1 is a diagram illustrating the relative disposal of the distributing system for compressed fluid in a self-propelled vehicle of the general type to which this invention is applicable more particularly; and FIGURE 2 is a diagram corresponding to the diagram of FIG. 1 but in the specific case of a vehicle equipped according to the teachings of this invention.

In the diagram of FIG. 1 showing a hydraulic system for controlling a self-propelled vehicle a group of pumps P driven from a motor A delivers compressed fluid to a distributor unit B. This distributor unit B comprises a device I for reversing the direction of motion of the vehicle, as well as pump selecting valves remote-controlled by means of a valve $V_1$ and braking valves adapted to be calibrated from a distance by means of remote control valves $V_2$ and $V_3$. Said thus formed compressed hydraulic fluid generating circuit comprises further, as usual, a reservoir of unpressurized hydraulic fluid, which is shown diagrammatically at different points of the drawing, with the same literal reference D.

This distributor unit B is adapted to supply compressed fluid to four hydraulic motors $M_1$, $M_2$, $M_3$, and $M_4$ drivingly connected to drive wheels $R_1$, $R_2$, $R_3$ and $R_4$. Valves $C_1$, $C_2$, $C_3$, $C_4$ actuated from a control valve $V_4$ through pilot lines $a_1$, $a_2$, $a_3$ and $a_4$ are adapted to disconnect from the circuit one or more hydraulic motors M, so as to provide different drive speeds according to the number of motor operated. Each of said valves $C_1$, $C_2$, $C_3$, $C_4$ is provided, as usual, with a pressure limiting device which, as shown diagrammatically in the drawing, when the hydraulic fluid exceeds a predetermined pressure, returns same to the unpressurized hydraulic fluid reservoir D.

It is clear that in this arrangement, with the hydraulic motors fed in parallel, if one of the drive wheels encounters a moderate reaction torque the corresponding hydraulic motor will race and absorb the major portion of the low-pressure fluid output, the speed of the other motors being reduced. A strong disproportion between the torques encountered by the different wheels may even bring the vehicle to a complete standstill.

According to this invention, the parallel-fed hydraulic motors of a vehicle of the type set forth hereinabove are synchronized through hydraulic means exclusively.

In the arrangement according to this invention as shown in the diagram of FIG. 2 there is added to each wheel R a pump p drivingly associated with the hydraulic motor M. These pumps $p_1$, $p_2$, $p_3$ and $p_4$ are mounted in series to a circuit b. Mounted in this circuit b downstream of each pump is a pipe line for returning the fluid to the reservoir through a non-return valve Cr and a safety valve Cs.

A pilot line $b_1$, $b_2$, $b_3$ and $b_4$ connects the output of each regulating pump $p_1$, $p_2$, $p_3$ and $p_4$ to each pilot control valve $C_1$, $C_2$, $C_3$ and $C_4$.

If all the hydraulic motors M revolve at the same speed, the pumps $p_1$, $p_2$, $p_3$ and $p_4$ revolve at the same speed likewise and the fluid delivered by one of these pumps is absorbed by the next one. No pressure is built up in the interval between any pair of adjacent pumps p and therefore throughout the hydraulic circuit b.

If for example the pump $p_3$ revolves at a speed greater than that of pumps $p_2$ and $p_4$, the fluid absorbed by pump $p_3$ will exceed that delivered by pump $p_2$. Under these conditions, the supply is restored through the non-return valve $Cr_2$. On the other hand, the fluid delivered by pump $p^3$ will exceed the quantity absorbed by pump $p_4$. Therefore, a pressure increment will occur between pumps $p_3$ and $p_4$ up to the value set up by the safety valve $Cs_3$. This pressure increase is transmitted through the hydraulic connection $b_3$ to the pilot means associated with valve $C_3$, thus closing the latter and discontinuing the supply of compressed fluid to motor $M_3$. Thus, the speed of motor $M_3$ is reduced to zero. Immediately, the speed of pump $p_3$ is reduced to zero and the same applies to the pressure within line $b_3$ with the pilot action on valve $C_3$, thus restoring the supply of compressed fluid to motor $M_3$. Consequently, a state of equilibrium of valve $C_3$ is established which determines the output necessary for so feeding the motor $M_3$ that the latter revolves at the same speed as the motors associated with the other wheels.

The safety valves Cs are so calibrated that the hydraulic interdependence of the wheels R may be rendered more or less strict, for example with a view to impart to this interdependence a flexibility sufficient to avoid any slippage of certain wheels when the vehicle is turning or driven at a relatively high speed.

Although the present invention has been described in conjunction with a preferred embodiment shown diagrammatically in the drawings, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. A hydraulic transmission system to move a plurality of loads, comprising a compressed hydraulic fluid generating circuit having a distributor, a plurality of feed valves connected to said distributor, a plurality of pilot lines each adapted when compressed fluid is supplied thereto to cause the closing of one of said feed valves, and a multiple valve controlling at will the separate delivery of compressed fluid to said pilot lines, and thus the separate closing of said feed valves; a plurality of hydraulic motors each connected to one of said feed valves and having a shaft mechanically connected to one of said loads to be moved; an auxiliary hydraulic circuit, a plurality of pumps mounted in series in said auxiliary hydraulic circuit and mechanically connected to the shafts of said hydraulic motors; and a plurality of hydraulic connections between said auxiliary circuit and said pilot lines, each one of said hydraulic connections causing the outlet of each pump to communicate with said one pilot line which is adapted, when compressed fluid is supplied thereto, to cause the closing of the feed valve of said one hydraulic motor of which the shaft is mechanically connected to said pump.

2. A hydraulic transmission system to move a plurality of loads, comprising a compressed hydraulic fluid generating circuit having a reservoir of unpressurized hydraulic fluid, a distributor, a plurality of feed valves connected to said distributor, a plurality of pilot lines each adapted when compressed fluid is supplied thereto to cause the closing of one of said feed valves and a multiple valve controlling at will the separate delivery of compressed fluid to said pilot lines, and thus the separate closing of said feed valves; a plurality of hydraulic motors each connected to one of said feed valves and having a shaft mechanically connected to one of said loads to be moved; an auxiliary hydraulic circuit, a plurality of pumps mounted in series in said auxiliary hydraulic circuit and mechanically connected to the shafts of said hydraulic motors; a plurality of hydraulic connections between said auxiliary circuit and said pilot lines, each one of said hydraulic connections causing the outlet of each pump to communicate with said one pilot line which is adapted, when compressed fluid is supplied thereto, to cause the closing of the feed valve of said one hydraulic motor of which the shaft is mechanically connected to said pump; and a plurality of other hydraulic connections inserted between said first hydraulic connections and said reservoir, each of said other hydraulic connections comprising two branch lines, a non return valve mounted in one of said branch lines and a pressure limiting device mounted in the other branch line.

3. A hydraulic transmission system to move a plurality of loads as set forth in claim 2, wherein said pressure limiting devices are adjustable.

References Cited in the file of this patent
UNITED STATES PATENTS

| | | |
|---|---|---|
| 2,437,139 | Tucker | Mar. 2, 1948 |
| 2,833,362 | Martin | May 6, 1958 |